United States Patent [19]
Weultjes et al.

[11] Patent Number: 5,858,203
[45] Date of Patent: Jan. 12, 1999

[54] METHOD AND DEVICE FOR TREATING A CONTAMINATED SLURRY

[75] Inventors: Iwan Johannes Wilhelmus Weultjes, Westerfoort; Pieter Lodder, Bemmel; Gerrit Derk Enoch, DJ Borne, all of Netherlands

[73] Assignee: N.V. Kema, Arnhem, Netherlands

[21] Appl. No.: 919,881

[22] Filed: Aug. 28, 1997

Related U.S. Application Data

[63] Continuation of Ser. No. 627,189, Apr. 3, 1996, abandoned.

[30] Foreign Application Priority Data

Apr. 4, 1995 [EP] European Pat. Off. .............. 95200857

[51] Int. Cl.$^6$ ..................................... C02F 1/461
[52] U.S. Cl. ......................... 205/759; 588/204; 210/601; 210/631
[58] Field of Search ............................ 205/759; 210/601, 210/631; 588/204

[56] References Cited

U.S. PATENT DOCUMENTS

| | | |
|---|---|---|
| 4,578,163 | 3/1986 | Kunter et al. ............................ 204/110 |
| 4,954,230 | 9/1990 | Kirch ...................................... 204/149 |
| 5,051,191 | 9/1991 | Rasmussen et al. ..................... 210/721 |

FOREIGN PATENT DOCUMENTS 61-028500  2/1986  Japan .
WO8806144  8/1988  WIPO .

OTHER PUBLICATIONS

Japanese Patent Publication No. JP 56150498, dated Nov. 20, 1981, Patent Abstracts of Japan, 1 page.

Shaukat Farooq et al., "Oxidation of Biological Sludges With Ozone", J. Environ. Sci. Health, A17(5), (1982), pp. 608–637.

*Primary Examiner*—Arun S. Phasge
*Attorney, Agent, or Firm*—Webb Ziesenheim Bruening Logsdon Orkin & Hanson, P.C.

[57] ABSTRACT

The invention relates to a method for treating a contaminated slurry comprising subjecting the slurry to a treatment wherein contamination is transferred from a substantially solid phase of the slurry to a substantially liquid phase of the slurry.

7 Claims, 6 Drawing Sheets

(Influence of ozone concentration on the desorption rate at 9% slurry)

(Influence of ozone concentration on the desorption rate at 19% slurry)

(Influence of the slurry/liquid ratios on the concentration of TC/TOC in the liquid phase)

(TC/TOC at (O$_3$) start = 20g/m$^3$ and 37% slurry)

(TC/TOC at (O$_3$) start = 110g/m$^3$ and 37% slurry)

METHOD AND DEVICE FOR TREATING A CONTAMINATED SLURRY

"This application is a continuation of application(s) Ser. No. 08/627,189 filed on Apr. 3, 1996 now abandoned.

FIELD OF THE INVENTION

The present invention relates to a method and device for treating a contaminated slurry.

Under slurry is understood species such as slurry and soil.

BACKGROUND OF THE INVENTION

In a large number of processes such as for instance coal gasification, refuse burning and processes in the chemical or metal industries, large quantities of waste are released. This waste contains different sorts of contaminants, such as organic matter in the form of petroleum and oil for example and heavy metals.

The treatment of ground and water beds is subject to increasingly strict regulations. A lot of attention is being given to the decontamination of industrial terrains, which can thereafter be used for further redevelopment. In the particular case of water beds, stringent regulations are being introduced relating to the amount of contaminated dredged up species which has to be processed. For instance the Dutch Government has stated that 20% of all contaminated slurry species must be processed in the year 2000.

Known processes for treating slurry include ozone treatment.

Ozone has been shown to react with organic compounds in two ways (Langlais, B. et al., 1991; Ozone in water treatment. Application and Engineering, Chelsea, Mich., USA, Lewis Pulbishers Inc., Nelson, C. H., Brown, R. A., 1994. Adapting ozonation for soil and ground water clean up. In; Chemical Engineering pp. EE 18–25)), by direct reaction by means of electrophylic or cyclo-addition and by indirect reaction via free radicals, formed from ozone after reaction with water or other compounds.

Under direct reaction, ozone reacts firstly with double bonds (C=C, C=C—O—R, C=C—X) or with atoms which are negatively charged (N, P, O, S, and nucleophilic carbon atoms). A high reactivity is therefore envisaged for ortho-activated aromatic compounds by OH, $CH_3$ or $OCH_3$. Dependent on the structure of products of the primary oxidation, ozone can also react with this.

Indirect ozone oxidation is non selective. In this instance, oxidation is carried out via a radical mechanism in which differing organic compounds can take part.

Under oxidation of aromatic compounds or polycyclic aromatic compounds (PAH's) the aromatic ring reacts first, resulting in decyclisation and loss of the aromatic structure or side chains. The primary formed products are unsaturated acids and quinones.

The international patent application PCT/DK88/00024 and the Journal of Environmental Science and Health, vol. A17, no. 5, 1982 Baton Rouge (USA) describe processes of ozone treatment.

Problems with these processes, however include controllability, and the cost inefficient consumption of ozone.

It is an object of the present invention to provide a method for the treatment by ozone of contaminated slurry, wherein the process is controllable and wherein ozone consumption is minimized.

SUMMARY OF THE INVENTION

This is achieved by a first aspect of the present invention, in a method for treating a slurry containing contaminants, the method comprising, subjecting the slurry to an ozone treatment whereby contamination is solubilised and desorbed from a substantially solid phase of the slurry and partially oxidised, wherein the contamination is transferred from a substantially solid phase of the slurry to a substantially liquid phase of the slurry.

DETAILED DESCRIPTION OF THE INVENTION

Figure 1:
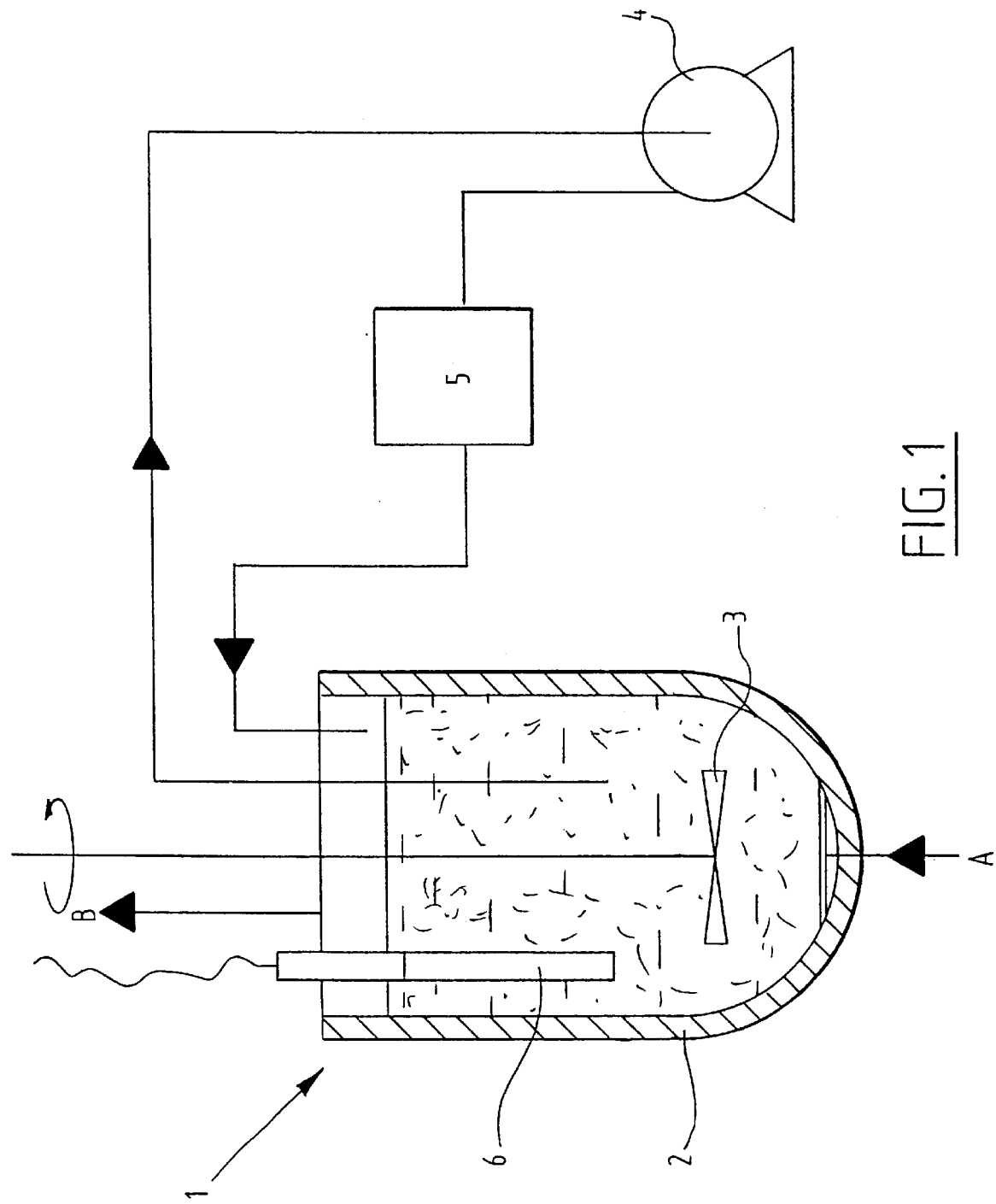
FIG. 1 is a schematic diagram of the system used to perform the invention.

The present invention comprises a method for treating a slurry containing contaminants, the method comprising, subjecting the slurry to an ozone treatment whereby contamination is solubilised and desorbed from a substantially solid phase of the slurry and partially oxidised, wherein the contamination is transferred from a substantially solid phase of the slurry to a substantially liquid phase of the slurry.

Following this treatment, the substantially solid phase and substantially liquid phase are preferably separated from each other.

The substantially liquid phase is preferably then subjected to a purification treatment comprising an electrolysis step, in order to remove heavy metals, and a biological degradation step, which is preferably carried out by micro-organisms to degrade undesired organic matter.

In this way, undesired organic matter and heavy metals are removed from the fluid phase, which can then also be returned to their source or recirculated into the treatment.

This solid phase can be further treated by washing with water or acid, for instance, in order to further remove remaining contamination such as heavy metals.

A further advantage of the present invention is that acid consumption, during heavy metal removal from the solid phase, is minimised, whereby the process is cost effective and less environmentally unfriendly.

The inventors postulate that this advantage is yielded since treatment of slurry according to the present invention, results in the substantially solid phase having a 'sandy-like' consistency, which is easy to process.

The substantially solid phase can be returned to its source.

According to a second aspect of the present invention there is provided a system for carrying out the above mentioned method comprising transfer means for transferring contamination in a substantially solid phase of a slurry into a substantially liquid phase of the slurry, and ozone supply means.

Preferably, the system further comprises separating means for separating the slurry into the substantially solid phase and the substantially liquid phase.

Furthermore the system preferably comprises electrolysis means for the removal of heavy metals, and biological degradation means preferably comprising micro-organisms for the degradation of unwanted organic matter.

An ultrasonic and/or an ultraviolet source may also be associated with the system to aid in contamination transfer and/or degradation of undesired matter.

The system according to the present invention is preferably mobile and/or portable, able to be assembled/disassembled and able to be powered by electricity.

In this way a slurry treatment system according to the present invention can be quickly and easily arranged in position and is able to be powered by the user's electricity source.

Furthermore, the user can carry out the treatment according to the invention without resorting to the services of specialized firms whereby costs are kept to a minimums.

The invention will be further elucidated with reference to the following figures, experiments, results, and tables.

Experiments were carried out by the inventors into the treating of contaminated slurry, dredged up from the petroleum harbour in Amsterdam in a contamination transfer system 1 schematically shown in FIG. 1.

The system 1 comprised a batch reactor 2, a stirrer 3, a slurry pump 4 (present only for experiment 1), an ultrasonic reactor 5 (present only for experiment 1) and an ultraviolet lamp 6 (present only for experiment 3).

During the experiments slurry was fed into the reactor 2 and ozone was mixed herewith via an ozone stream (arrow A), pumped into the reactor 2 from beneath, by means of the stirrer 3.

A residual ozone stream (arrow B) was emitted from the reactor 2.

Demi water was also added in order to homogenize the slurry and make it easier to pump.

Experimental Conditions

Experiment 1: 400 g slurry, 4000 ml of demi water fed into the reactor, demi water 5.1 g $O_3$/hour for 6 hours, 100 g ozone/$m^3$ an ultrasonic power of 100 W.

In experiment 1, and ultrasonic reactor was placed in the slurry loop to investigate the effects of ultrasonic waves on the treatment in combination with ozone.

Experiment 2: 400 g slurry, 4000 ml of demi water fed into the reactor, 5.1 g $O_3$/hour for 6 hours, 100 g ozone/$m^3$.

Experiment 2 was carried out in the presence of ozone alone.

Experiment 3: 400 g slurry, 4000 ml of demi water fed into the reactor, 5.1 g $O_3$/hour 6 hours, 100 g ozone/$m^3$ and uv lamp 150 Watts.

Experiment 3 was carried out with ultraviolet light in combination with ozone to investigate the effects of this.

Experiment 4: The solid phase from experiment 2 was separated from the liquid phase and subjected to a further 5 hours of ozone treatment (5.1 g/hour, 100g/$m^3$) whereby 4000 ml demi water was added to the separated solid phase.

The total carbon content/total organic carbon content transferred from the solid phase of the slurry to the liquid phase of the slurry was measured in the experiments and the results are shown in FIGS. 2, 3, 4 and 5 which respectively, graphically show the results from experiments 1, 2, 3 and 4.

Under total organic carbon is understood the carbon content in mg carbon per liter (ppm) originating from organic contaminants, such as hydrocarbons and aromatics.

Under total carbon is understood carbon content in mg carbon per liter (ppm) originating from organic and inorganic contaminants, such as hydrocarbons, aromatics, carbonates and $CO_2$.

Figure 3:
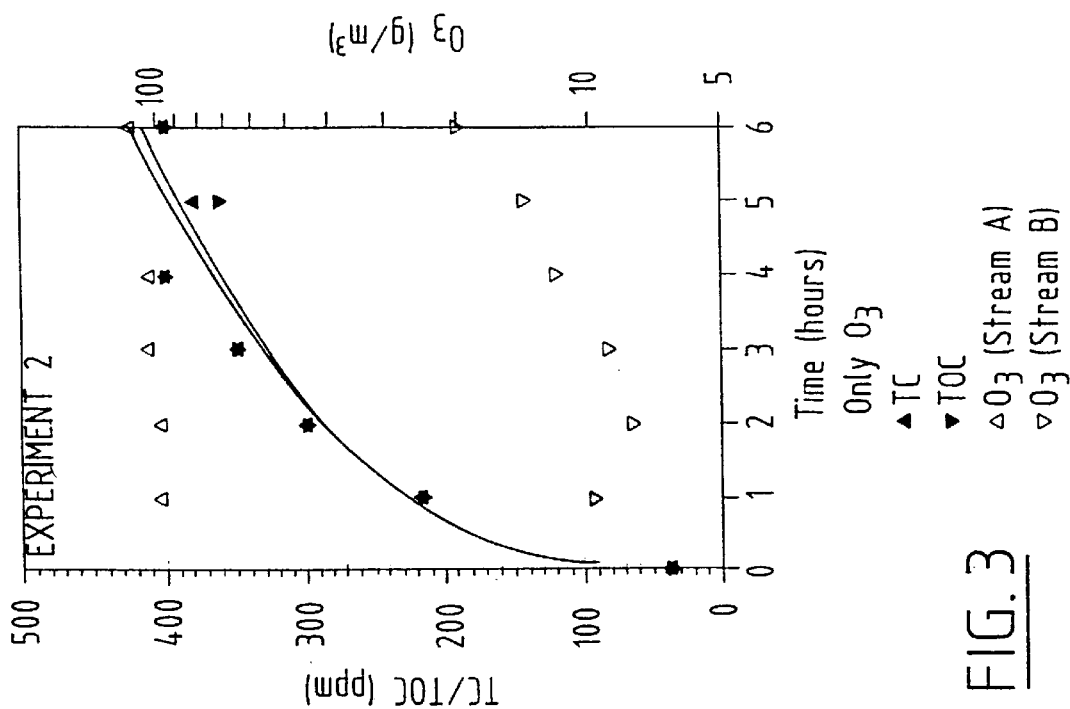
FIG. 3 is a graph of the TC/TOC content transferred from the solid phase of the slurry to the liquid phase of the slurry over time from Experiment 2.
Figure 2:
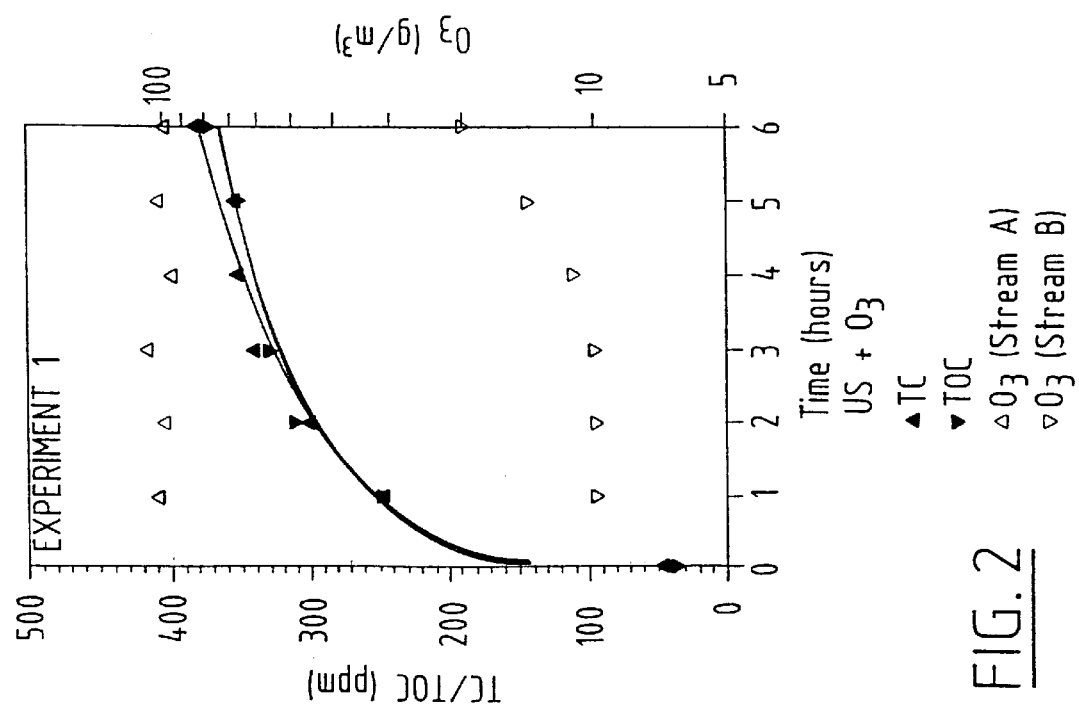
FIG. 2 is a graph of total carbon content/total organic carbon content (TC/TOC) transferred from the solid phase of the slurry to the liquid phase of the slurry over time from Experiment 1.
Figure 5:
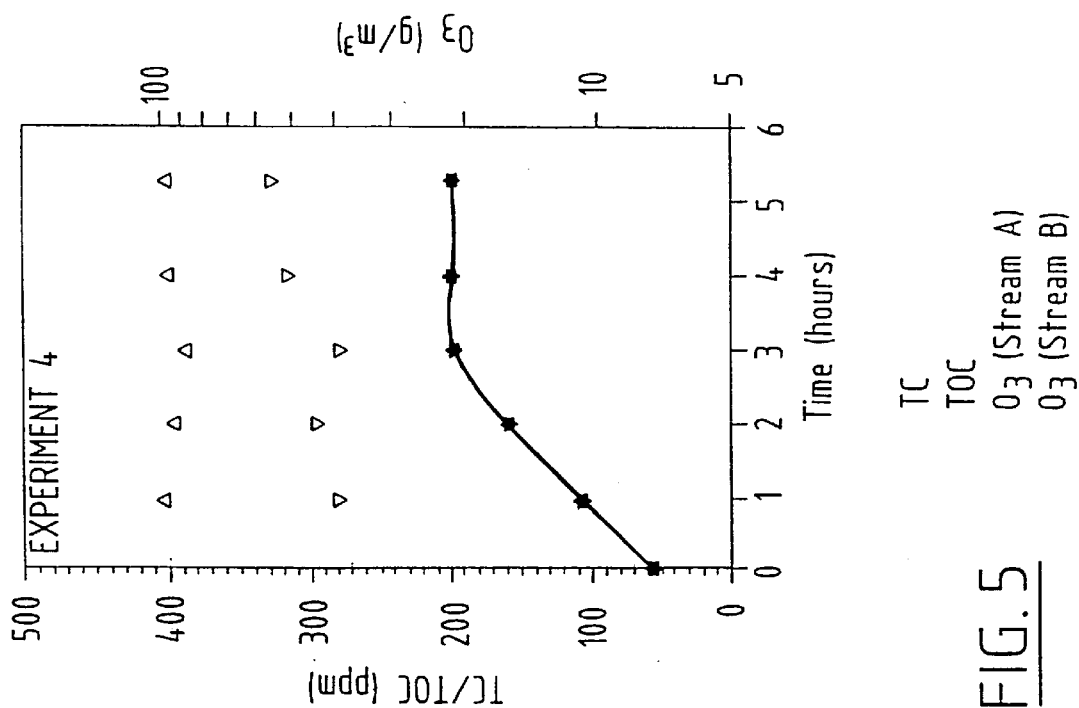
FIG. 5 is a graph of the TC/TOC content transferred from the solid phase of the slurry to the liquid phase of the slurry over time from Experiment 4.
Figure 4:
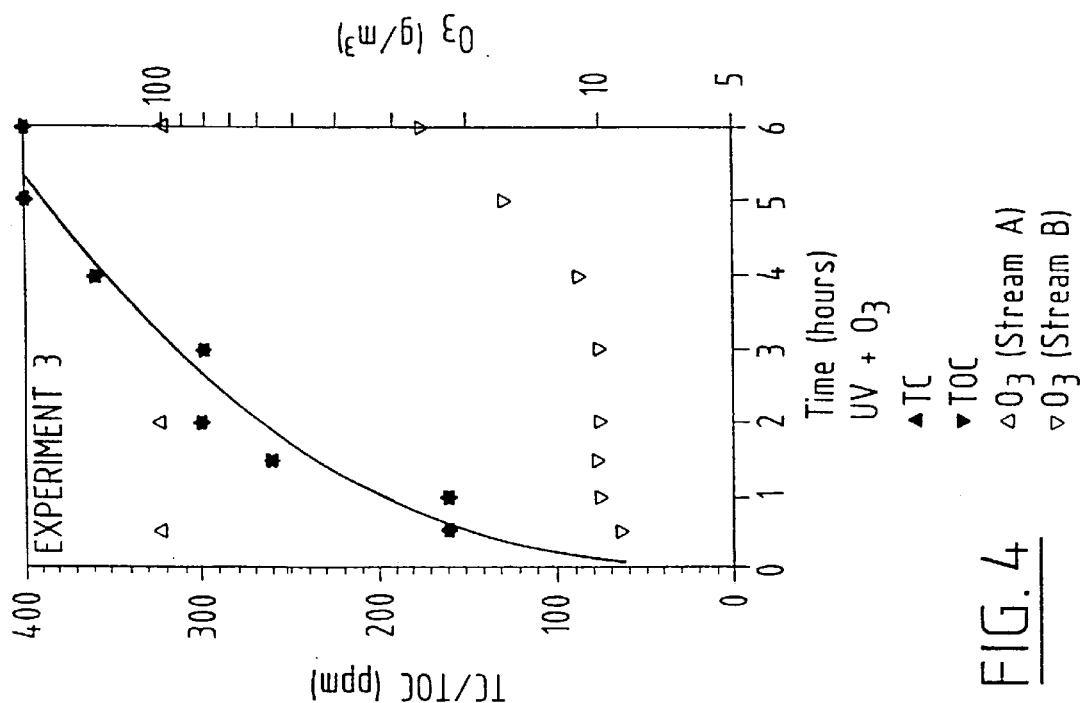
FIG. 4 is a graph of the TC/TOC content transferred from the solid phase of the slurry to the liquid phase of the slurry over time from Experiment 3.

It will be seen from FIGS. 2 and 3 that there is very little difference for the total organic carbon and total carbon curves, whereby it can be concluded that oxidation (breakdown) of organic matter into carbonates and $CO_2$ under addition of ozone substantially did not take place, the organic matter being desorbed from the solid phase, solubilised and transferred to the liquid phase.

In experiment 4 a residual slurry sample was taken after 11 hours of treatment.

The results obtained were compared with the contamination levels in the original slurry sample and former acceptable Dutch contamination levels and are shown in table 1.

An analysis of zinc and lead content in the separated liquid phase is also given.

TABLE 1

| Analysis of | Originally | Product | Former acceptable contamination levels in the Netherlands (Thresh hold values) |
|---|---|---|---|
| Dry material (%) | 41 | 58 | |
| Mineral oil (mg/kg) | 16000 | 735 | 1000 |
| Naphthalene (mg/kg) | <1.0 | <0.2 | 5 |
| Fenantrene | 180 | 5.7 | 10 |
| Anthracene | 5.5 | 0.2 | 10 |
| Fluorantrene | * | * | 10 |
| Benzo(A)antr | * | * | 5 |
| Chrysene | 31 | 3.1 | 5 |
| Benzo(K)fluo | 9.8 | 0.7 | 5 |
| Benzo(A)pyre | 19 | 1.4 | 1 |
| Benzo(Chi)pe | 9.3 | 1.1 | 10 |
| Indeno(123cd | 10 | 1.4 | 5 |
| Total 10 | <265.6 | <13.8 | 20 |
| Zinc | 436 | 330 | 500 |
| Lead | 205 | 324 | 150 |
| Water sample ($\mu g/l$) | | | |
| Zinc | | 4780 | 200 |
| Lead | | 90 | 50 |

During the 11 hour ozone treatment of the slurry (experiment 4) 95.5% of the mineral oil was removed.
Heavy metals transferred into the substantially liquid phase
Zinc 8 1 * 4780 $\mu g/l$=38 mg Lead 8 1 * 90 µg/l=0,07 mg There was originally 92 mg of zinc present in the slurry of which 38 mg were transferred into the fluid phase. There was therefore 41% transference of lead into the liquid phase.

In order to further investigate the influence of ozone concentration on the treatment, further experiments were carried out, wherein the ozone concentration was varied with two differing solid loads in the reactor.

Experiment 5 was carried out in the reactor with 150 grams of slurry in 1500 grams of demineralized water (9% slurry).

Figure 7:
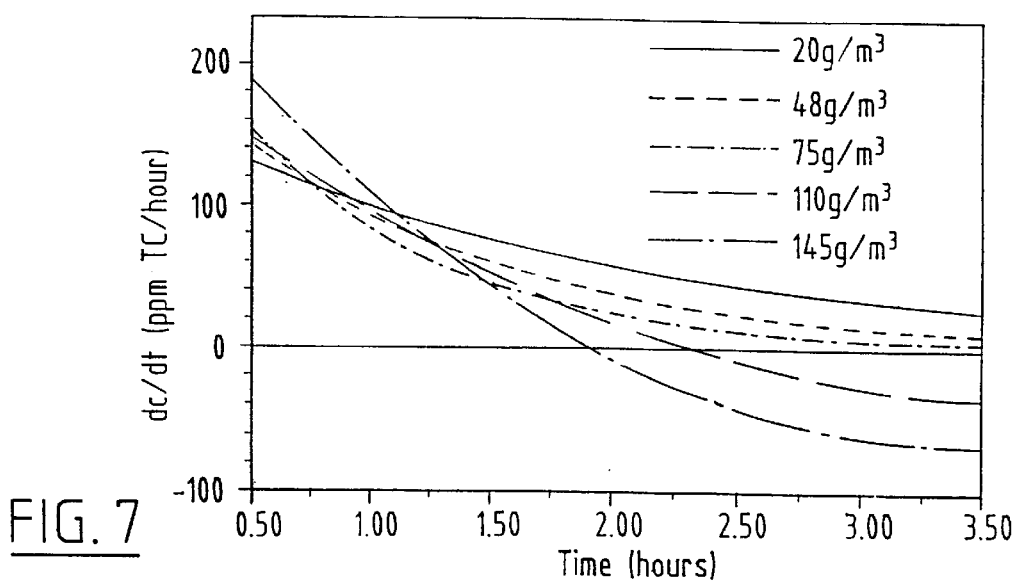
FIG. 7 is a graph of the time derivative of the TC/TOC content curve over time from Experiment 5.

The influence of the ozone concentration on the desorption rate with 9% slurry is shown in FIG. 7. The desorption rate (dc/dt) is defined as the rate increase of the TC/TOC content in the liquid phase at a determined time. Mathematically, FIG. 7 is the time derivative of the TC/TOC content curve as a function of the time.

From FIG. 7 it follows that the desorption rate hardly changed within the concentration range of 20–75 g/m$^3$ ozone. It is clear that at greater ozone concentrations, the desorption rate became negative.

It is presumed that at these higher concentrations, ozone is being used for the complete oxidation of the organic materials in the liquid phase. This change between desorption by ozone to the liquid phase oxidation by ozone is dependent on the solid concentration and the type of slurry. The point of change from desorption to oxidation has to be experimentally determined for each type of slurry.

Experiment 6 was carried out with a quantity of 300 grams of slurry in 1.25 liters of demiwater (19% slurry). The influence of the ozone concentration on the desorption rate with 19% slurry is reproduced in FIG. 8.

Figure 8:
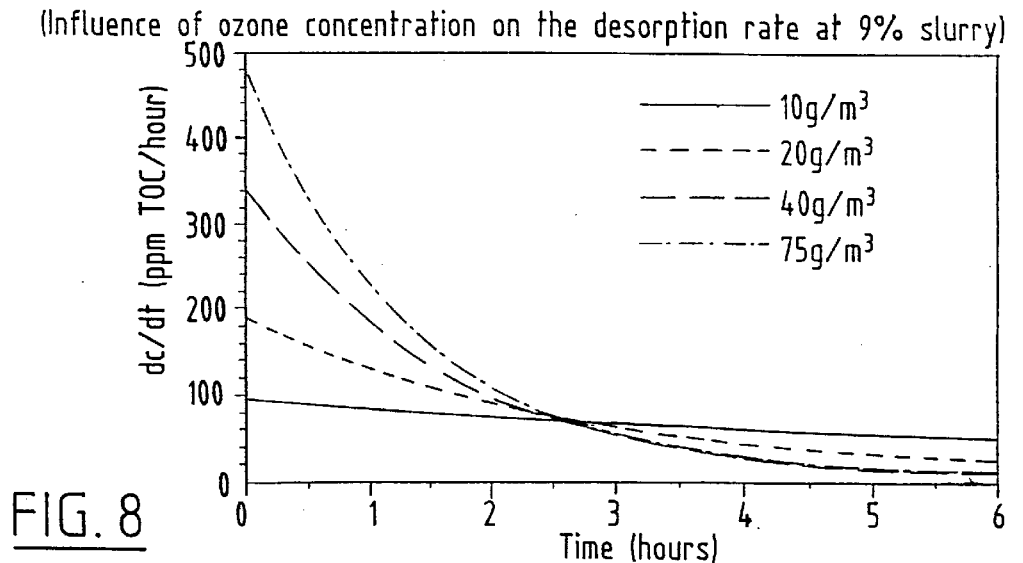
FIG. 8 is a graph of the time derivative of the TC/TOC content curve over time from Experiment 6.

From FIG. 8 it follows that at the start there is a large difference in desorption rate when comparing the applied ozone concentration between 10 and 75 g/m$^3$ ozone. At a later phase this difference is zero. The desorption rate remained however positive whereby it was concluded that ozone was not used for complete oxidation.

The influence of slurry concentration on the method according to the present invention was also investigated, at two differing ozone concentrations.

Figure 11:
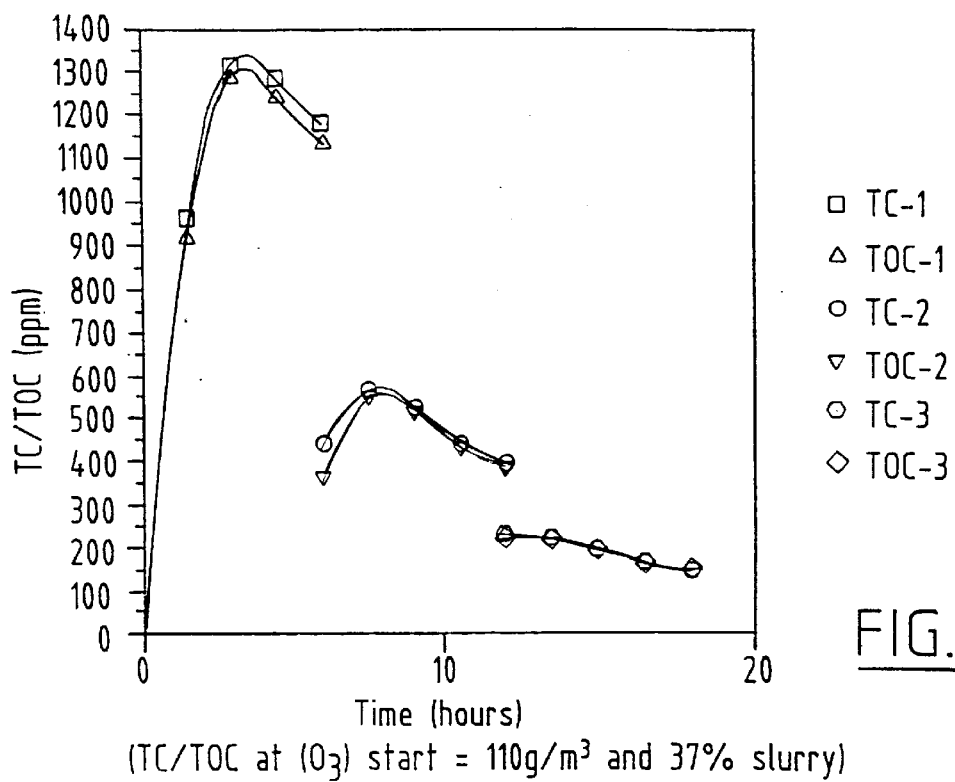
FIG. 11 is a graph of the TC/TOC content transferred from the solid phase of the slurry to the liquid phase of the slurry over time at high ozone concentration.

Experiment 7 was carried out with an entering ozone concentration of 110 mg/m$^3$, wherein the TC/TOC concentration in the liquid phase decreased with time (see FIG. 11).

It was concluded that ozone, at this high concentration, was used for complete oxidation of the organic components in the liquid phase.

Figure 10:
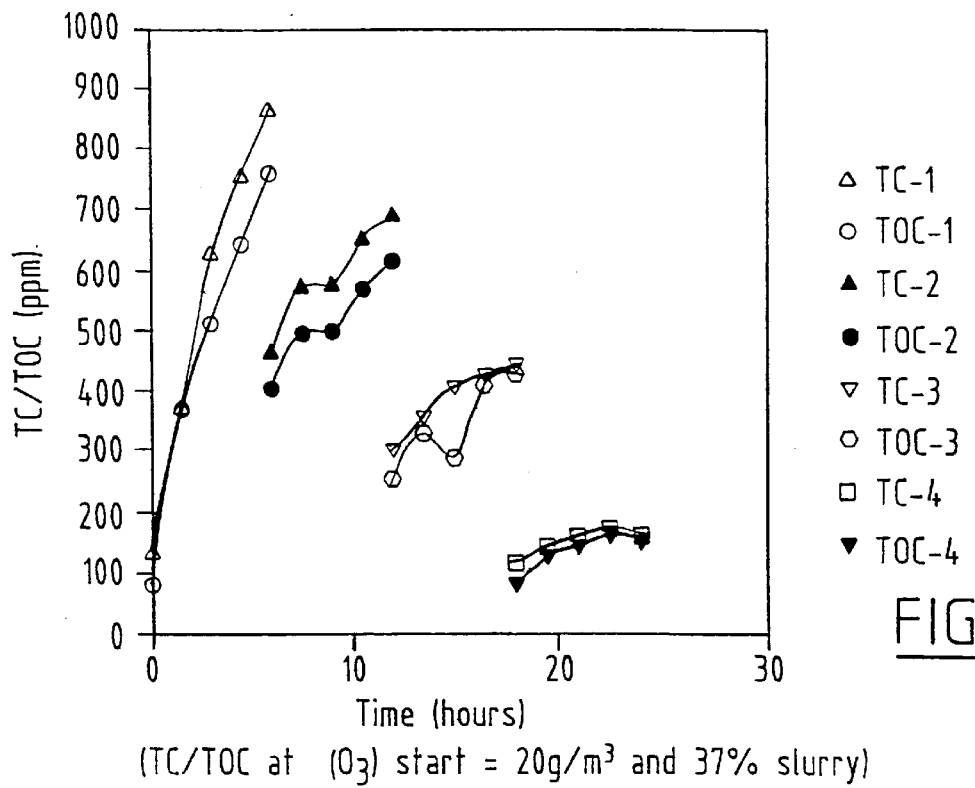
FIG. 10 is a graph of the TC/TOC content transferred from the solid phase of the slurry to the liquid phase of the slurry over time at low ozone concentration.

A further experiment, 8, was carried out with an entering ozone concentration of 20 mg/m$^3$ (see FIG. 10).

Figure 9:
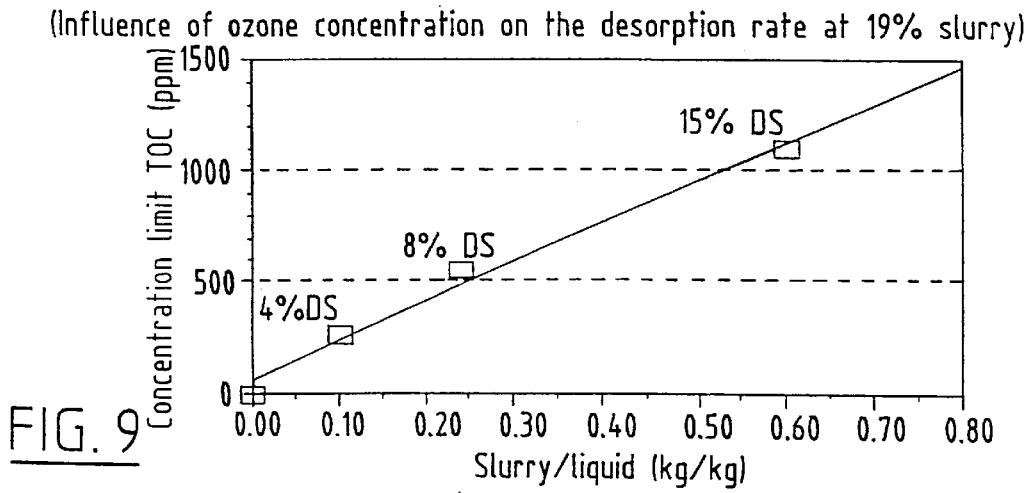
FIG. 9 is a graph of the maximum achievable concentration of organic materials in the liquid phase of the slurry as a function of slurry/liquid ratio from Experiment 8.

The maximum achievable concentration of organic materials in the liquid phase was plotted against the slurry/liquid ratio for an ozone concentration of 45 mg/m$^3$, there appeared a linear relationship (FIG. 9). This maximum achievable concentration corresponds to the saturation concentration ($c_s$) calculable from the formula, below.

Mass transport of the solid particles to the bulk of the liquid during transportation can be described by means of the film model. Resistance against mass transport is formed by a thin liquid film. The model for this is given by the formula:

$$V \frac{dc}{dt} = \frac{D}{\delta} A(c_s - c)$$

wherein

A is the liquid solid surface m$^2$ $\delta$ is the liquid film thickness m c is the bulk concentration g/m$^3$ $c_s$ is the saturation concentration of the particles g/m$^3$ D is the diffusion coefficient m$^2$/s This model, dependent on the loading of the solid, is applicable for certain ozone concentrations. At a relatively low ozone concentration, desorption by ozone is described according to this formula.

From FIGS. 7 and 8 it appears that it is advantageous to carry out desorption in a number of steps with high slurry concentration. In this instance, optimum use is made of the high desorption rate at the start of the desorption step. In order to investigate this, two further experiments were carried out with differing ozone concentrations. The TC/TOC curves for these experiments are reproduced in FIGS. 10 and 11.

With the high ozone concentrations from FIG. 11, the TC/TOC concentrations, after an initial increase, decreased. in this case, ozone was used for complete oxidation, i.e. breakdown, of the organic components in the liquid phase (mineralization). This did not occur with the lower ozone concentrations (see FIG. 10).

It appears from calculations that the desorbed mineral oil, dependent on the applied concentration of ozone, was found 76–100% in the liquid phase (see table 1). The ozone is therefore only used for a very small portion for the complete oxidation (mineralization, i.e. breaking down into $CO_2$ and $H_2O$) of the organic material in the liquid phase.

A ratio of carbon/hydrogen was here presumed of 1/1.2. It is theorized that ozone is partly used to desorb the adsorbed organic materials and to make these water soluble. The extent of mineralization with three different experiments is shown in table 1. The data of the experiments with the two litre reactor are based on the experiments of which the TC/TOC curves are shown in FIGS. 10 and 11.

TABLE 2

Optimalization of ozone consumption

| Treatment | 9 hour 100 g/m$^3$ (base experiment) 5 liter reactor | 3 * 6 hour 110 g/m$^3$ 2 liter reactor | 4 * 6 hour 20 g/m$^3$ 2 liter reactor |
|---|---|---|---|
| Final concentration of mineral oil [mg/kg DM] | 735 | 615 | 1325 |
| Final concentration of PAK's [mg/kg DM] | 13.8 | 9.45 | 10.14 |
| Ozone consumption per ton dry material [kg] | 176 | 198 | 76 |
| Mineralized part [%] | 0 | 24 | 8 |
| Efficiency of ozone consumption [%] | 63 | 41 | 65 |

DM = Dry matter

From the table it follows that the mineralized part of the organic material is dependent on both the reactor design (volume) and the ozone concentration. Lowering the ozone concentration resulted in a decrease in the ozone consumption per ton dry slurry.

Two experiments were carried out to investigate the removal of heavy metals from the slurry. During these experiments, the pH was reduced stepwise. The percentage of heavy metals removed (together with the metal concentrations in the liquid and the metal concentrations which were originally in the solids) at a pH=1 for Petroleum harbour species and species from the harbour at Elburg (the Netherlands) are shown in table 3 and 4 respectively.

Table 3 Removal of heavy metal from the dredged up species from the Petroleum harbour at a pH of 1.

TABLE 3

Removal of heavy metal from the dredged up species from the Petroleum harbour at a pH of 1.

| Metal | Liquid concentration [mg/l] | Solid concentration [mg/g DM] | Percentage removed [-] |
| --- | --- | --- | --- |
| Zinc | 28 | 436 | 57.8 |
| Cadmium | 0.2 | 2 | 90 |
| Lead | 17 | 205 | 74.6 |
| Copper | 3 | 90 | 0.3 |

DM = Dry Matter

Table 4 Removal of heavy metals from dredged up species from the harbour at Elburg at a pH of 1

TABLE 4

Removal of heavy metal from the dredged up species from the harbour at Elburg at a pH of 1

| Metal | Liquid concentration [mg/l] | Solid concentration [mg/g DM] | Percentage removed [-] |
| --- | --- | --- | --- |
| Zinc | 17 | 80 | 191.3 |
| Cadmium | 0.03 | 1 | 27 |
| Lead | 11 | 20 | 495 |
| Copper | 1.2 | 10 | 108 |

DM = Dry Matter

From these table it follows that extensive removal of heavy metals from dredged up species is possible by decreasing the pH to 1.

For slurry which had been treated by ozone according to the present invention, from the Petroleum harbour (40 grams of dry material in 360 ml of demineralized water), 49 ml of 1 molar nitric acid was required.

For slurry treated with ozone from the Elburg harbour, 38 ml of 1 molar nitric acid was required.

The nitric acid consumption for slurry not treated with ozone according to the present invention is much higher. For 100 grams of untreated slurry (37% of dry material in 300 ml of demineralized water), 54 ml of 1 molar nitric acid was required to achieve a pH of 5. Furthermore, in order to maintain this pH, roughly 5 ml of acid per hour is required due to the buffer working of the slurry.

It can be concluded that due to the ozone treatment of the present invention, the consistency of the slurry changes from being margarine-like to sandy-like, whereby heavy metals can be easily and cost effectively removed with acid, which is not the case with slurry not treated with ozone according to the present invention.

Figure 6:
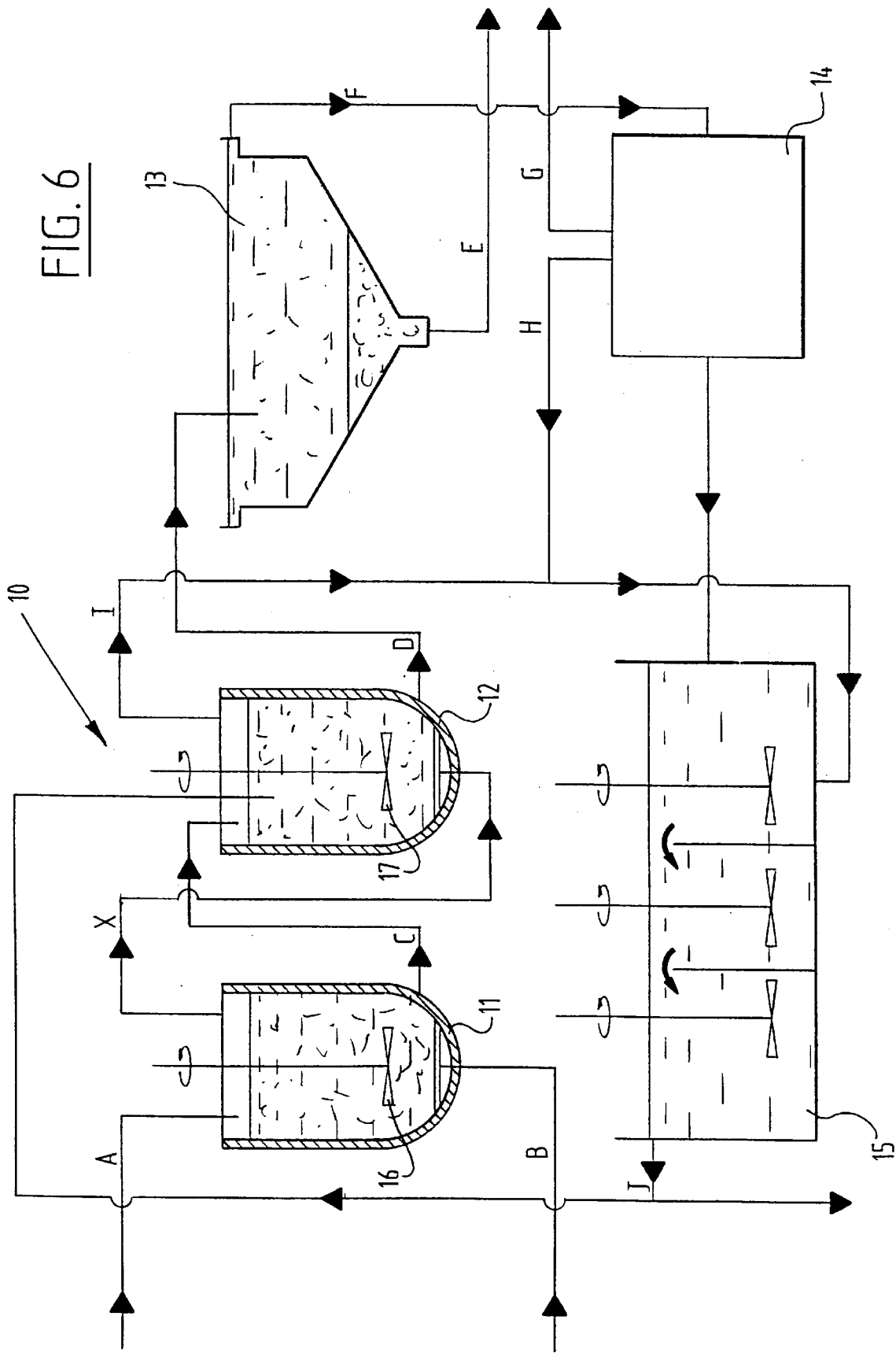
FIG. 6 is a schematic diagram of the system according to the present invention.

A preferred embodiment of the system according to the present invention is schematically shown in FIG. 6.

The system 10 comprises two stirred batch reactors 11, 12, a phase separation unit 13, an electrolysis unit 14 and three sequentially arranged biological degradation units is comprising micro-organisms.

In use slurry is fed (stream A) into the first reactor 10 into which ozone (stream B) is also fed. Mixing of the ozone and slurry is carried out by a stirrer 16, after which slurry is then transported (stream C) into a second reactor 12, where mixing via a second stirrer 17 is further carried out.

ozone, not used in the first reactor 10, is fed (stream X) from the first reactor 10 to the second reactor 11.

Slurry is transported (stream D) from the second reactor 12 to the phase separation unit 13 (which may comprise at least one hydrocyclone (not shown)) where the substantially solid phase of the slurry is separated from the substantially liquid phase of the slurry.

The substantially solid phase of the slurry, now substantially contaminant free, is emitted from the phase separation unit 13 (stream E).

The substantially liquid phase of the slurry (stream F) is then guided through the electrolysis unit 14, which preferably comprises at least one electrolytic cell, and thereafter through the biological degradation units 15.

The substantially liquid phase of the slurry is accordingly purified of heavy metals in the electrolysis unit and purified of undesired organic matter, in the biological degradation units.

The heavy metals are removed from the substantially liquid phase in the electrolysis unit 14, substantially in metallic form Thereafter they may be re-used.

The substantially solid phase (stream E) emitted from the phase separation unit 13 can be further washed, for instance with water or acid, in order to remove remaining contamination such as extra heavy metals, or organic contaminants.

Hydrogen emitted from the electrolysis unit 14 is led away (stream G) whereby this hydrogen can be used as an electron donor for the biological degradation treatment for instance.

Oxygen (stream H) also released in the electrolysis unit 14 can be guided back into the system along with residual ozone (stream I) in order to improve/accelerate degradation in the biological degradation units 15, thereby yielding a synergistic effect.

The purified liquid phase (stream J) emitted from the biological degradation units, may be recirculated back into the system.

The invention is not limited to the embodiment hereabove described, but rather, within the range of the following claims, a number of variations are conceivable.

We claim:

1. A method for treating a slurry containing at least one of carbon and organic carbon contaminants, the method comprising:

subjecting the slurry to an ozone treatment such that the contaminants are solubilized and desorbed from a substantially solid phase of the slurry and partially oxidized, wherein the contaminants are transferred from the substantially solid phase of the slurry to a substantially liquid phase of the slurry; and supplying an amount of ozone to the slurry for a particular length of time and for a particular quantity of a specific slurry species such that a desorption rate of the slurry is greater than zero.

2. The method according to claim 1 wherein oxidation of the contaminants is incomplete.

3. The method according to claim 1 wherein the ozone treatment is carried out in more than one step.

4. The method according to claim 1 wherein the ozone concentration is increased with time.

5. The method according to claim 1 wherein the slurry is separated into a substantially liquid phase containing the contaminants and a substantially decontaminated, substantially solid phase.

6. The method according to claim 5 wherein the substantially liquid phase is subjected to a purification treatment comprising at least one of the following steps of:

biologically degrading the liquid phase, wherein organic contamination is degraded; and electrolyzing the liquid phase, wherein contaminant heavy metals are precipitated out.

7. The method according to claim 5, wherein the substantially decontaminated, substantially solid phase is washed.

* * * * *